Dec. 4, 1962 L. T. HAYNES 3,066,898
ELECTRIC MOTOR AND ENGINE MOUNT
Filed Aug. 31, 1961 2 Sheets-Sheet 1
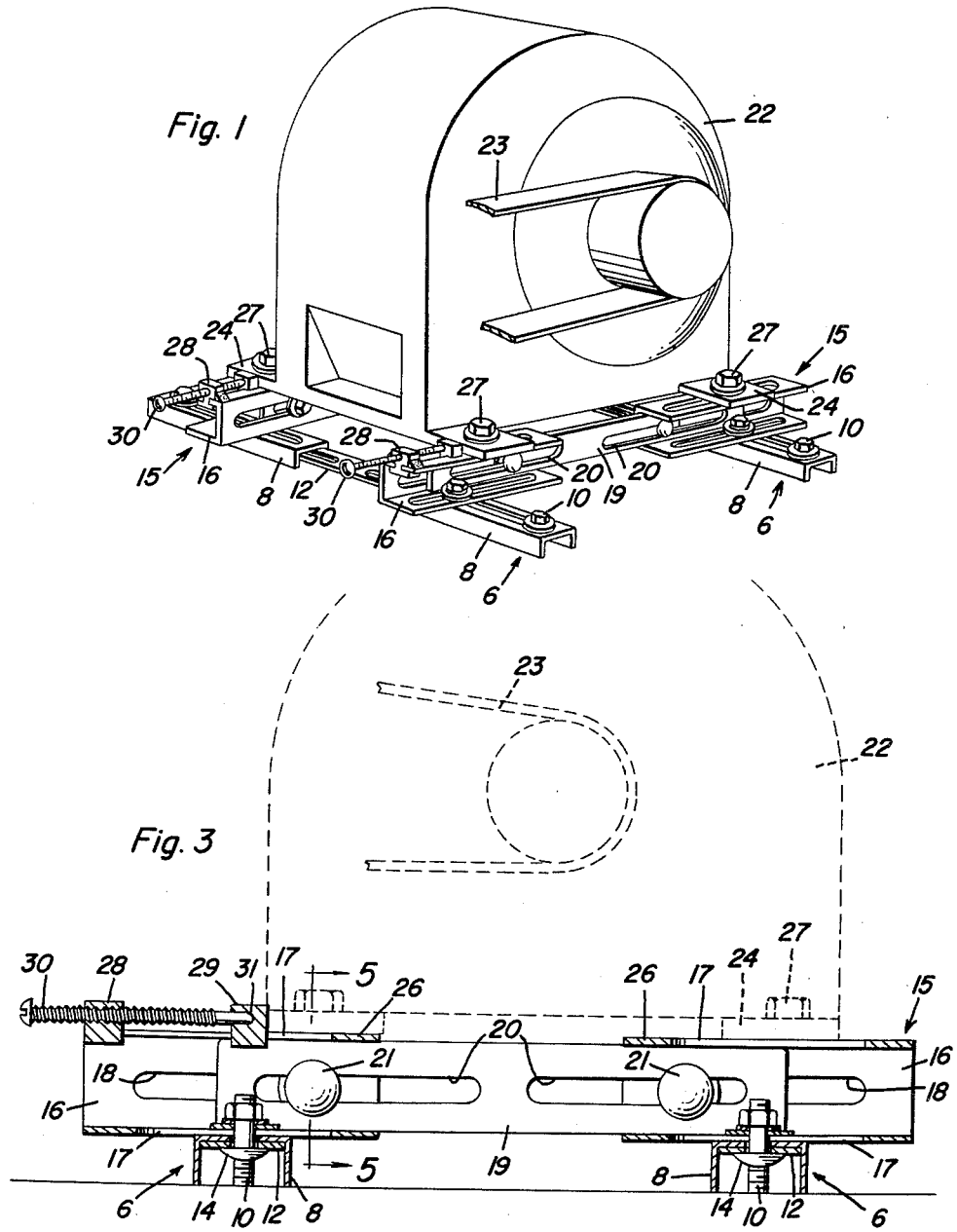
Leonard T. Haynes
INVENTOR.

Dec. 4, 1962          L. T. HAYNES          3,066,898
ELECTRIC MOTOR AND ENGINE MOUNT
Filed Aug. 31, 1961          2 Sheets-Sheet 2
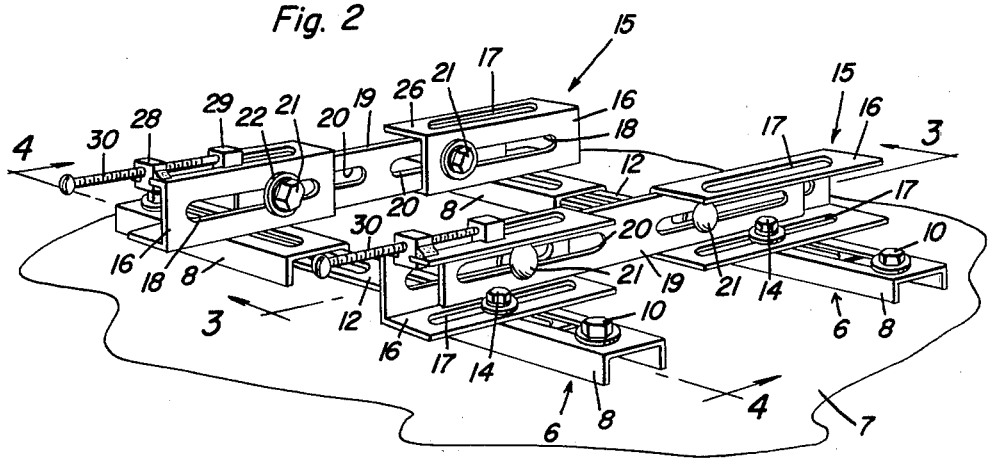
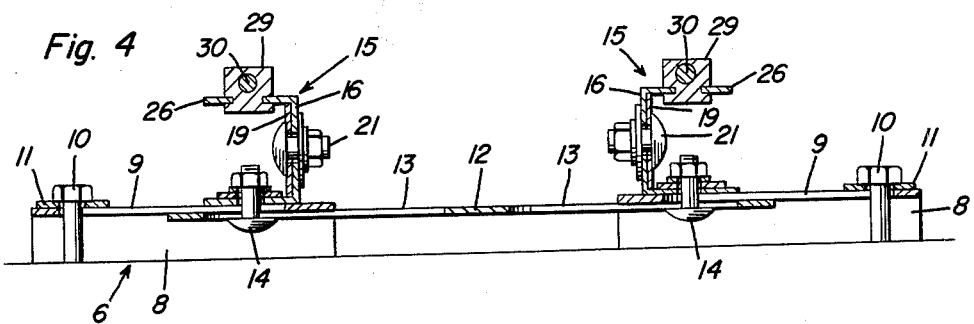
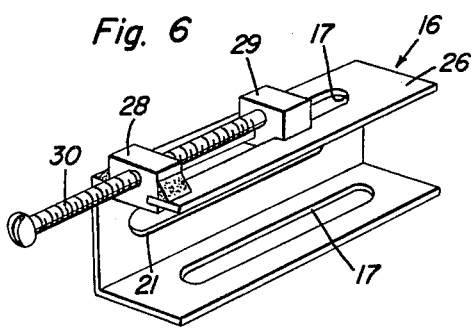
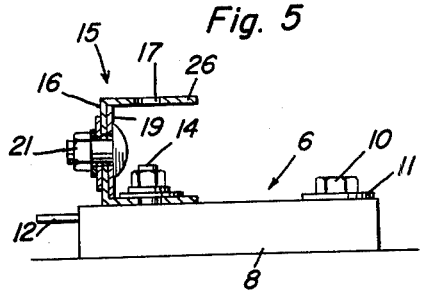
Leonard T. Haynes
INVENTOR.

3,066,898
ELECTRIC MOTOR AND ENGINE MOUNT
Leonard T. Haynes, 814 6th St., P.O. Box 441,
Gothenburg, Nebr.
Filed Aug. 31, 1961, Ser. No. 135,209
4 Claims. (Cl. 248—23)

This invention relates to new and useful improvements in mounts particularly although not necessarily for small engines, electric motors and generators and has for its primary object to provide, in a manner as hereinafter set forth, a device of this character which is substantially universally adjustable to accommodate motors, etc., of various sizes and shapes and to meet other conditions.

Another very important object of the present invention is to provide an improved adjustable motor, etc., mount of the aforementionel character comprising novel belt adjusting or tightening means.

Other objects of the invention are to provide an improved, readily adjustable motor, etc., mount of the character described which will be comparatively simple in construction, strong, durable, compact, of light weight and which may be manufactured and installed at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view, showing a small electric motor in position on a mount constructed in accordance with the present invention;

FIGURE 2 is a perspective view of the mount per se;

FIGURE 3 is a vertical sectional view on an enlarged scale, taken substantially on the line 3—3 of FIGURE 2;

FIGURE 4 is a vertical sectional view on an enlarged scale, taken substantially on the line 4—4 of FIGURE 2;

FIGURE 5 is a fragmentary view in vertical section, taken substantially on the line 5—5 of FIGURE 3; and FIGURE 6 is a perspective view of one of the belt tighteners.

Referring now to the drawing in detail, it will be seen that the embodiment of the invention which has been illustrated comprises a pair of spaced, parallel lower bars of suitable metal which are designated generally by reference numeral 6. The lower bars 6 are secured in position on a base 7 of concrete or other suitable material. Toward this end, the lower bars 6 include inverted channel end sections 8 having longitudinal slots 9 in the bight or top portion thereof which accommodate anchoring bolts 10, said slots permitting adjustment of said end sections. Washers 11 are provided between the end sections 8 and the heads of the bolts 10.

The end sections 8 of the lower bars 6 are connected for longitudinal sliding adjustment through the medium of flat intermediate sections 12. The intermediate sections 12 of the lower bars 6 are provided with longitudinal slots 13 which communicate with the slots 9 for receiving securing bolts 14. It will thus be seen that the sections 8 and 12 of the lower bar 6 are longitudinally extensible and retractible, the adjustment being secured by the bolts 14. Also, the end sections 8 of the bars 6 are of a width to slidably receive therein the intermediate sections 12.

Mounted for longitudinal and lateral adjustment on the lower bars 6 of the mount is a pair of spaced, parallel upper bars 15 which, it will be noted, extend transversely across said lower bars. The upper bars 15 are also of suitable metal and comprise outwardly laterally opening channel end sections 16 having longitudinal slots 17 in the upper and lower flanges thereof. The bight portions of the end sections 16 of the upper bars 15 are provided with longitudinal slots 18.

The upper bars 15 further comprise flat intermediate sections 19 which adjustably connect the end sections 16. Toward this end, the intermediate sections 19 are provided with longitudinal slots 20 communicating with the slots 18 and which receive bolts 21 for frictionally securing the adjustment. Washers 22 are provided between the bight portions of the bar sections 16 and the heads of the bolts 21. It will thus be seen that the end sections 16 of the upper bars 15 are longitudinally adjustable on the intermediate sections 19 of said bars. The lower slots 17 of the end sections 16 communicate with the slots 9 in the bar sections 8 (see FIGURE 4) for receiving the bolts 14 for securing the upper bars 15 in adjusted position on the lower bars 6. It will thus be seen that in addition to securing the longitudinal adjustment of the members 8 relatively to the members 12, the bolts 14 secure the longitudinal and lateral adjustments of the upper bars 15 on the lower bars 6.

In FIGURE 1 of the drawing, reference numeral 22 designates a conventional small electric motor secured in position on the mount. Operatively connected to the electric motor 22 is an endless drive belt 23. The motor 22 includes the usual apertured feet 24 which are adjustably secured on the upper flanges 26 of the end sections 16 by bolts 27. The longitudinal slots 17 in the upper flanges 26 of the end sections 16 permit sliding adjustment of the motor 22 on the upper bars 15.

Fixed in the outer end portions of the upper slots 17 of a pair of the end sections 16 on one end of the upper bars 15 is a pair of threaded, apertured lugs or ears 28. Blocks 29 are mounted for longitudinal sliding adjustment in the upper slots 17, said blocks being adapted for abutting engagement with the adjacent base portions of the motor 22 and having grooves, as shown, in the sides thereof slidably receiving the flanges 26 for mounting said blocks 29 thereon. Adjusting screws 30 are threadedly mounted in the lugs or ears 28 and have their forward end portions rotatably engaged in sockets 31 (see FIGURE 3) which are provided therefor in the blocks 29.

It is thought that the operation or use of the mount will be readily apparent from a consideration of the foregoing. Briefly, the lower bars 6 are longitudinally adjusted to the desired length and anchored to the base or foundation 7 by the bolts 10 embedded in said base. The upper bars 15 are then longitudinally adjusted to the desired length and secured by the nutted bolts 14 in laterally and longitudinally adjusted position on the lower bars 6. It will be noted that the construction and arrangement is such as to provide substantially universal horizontal adjustment of the mount. The small electric motor 22 is then positioned on the bars 15 and secured by the bolts 27. To shift the motor 22 in a direction to tighten the belt 23 the bolts 27 are loosened and the screws 30 are threaded forwardly in the lugs 28 for actuating the blocks 29 in an obvious manner. Of course, after the desired adjustment has been made the bolts 27 are again tightened.

The foregoing is considered as illustrative only of the principles of the invention. Further, since numerous modifications and changes will readily occur to those skilled in the art, it is not desired to limit the invention to the exact construction and operaion shown and described, and accordingly all suitable modifications and equivalents may be resorted to, falling within the scope of the invention as claimed.

What is claimed as new is as follows:

1. A motor mount comprising a plurality of spaced, parallel lower bars for mounting on a base, a plurality of spaced, parallel upper bars, for receiving thereon a motor, mounted transversely on said lower bars for longitudinal and lateral sliding adjustment, and means for securing the upper bars in adjusted position, said lower bars including flat intermediate sections and inverted channel end sections mounted for longitudinal sliding adjustment on said intermediate sections, said upper bars comprising flat central sections, and laterally opening channel end sections mounted for longitudinal sliding adjustment on said central sections, the second-named channel sections resting on the first-named channel sections at right angles thereto, said second and first-named channel sections having longitudinal communicating slots therein, said means including nutted bolts engaged in the communicating slots.

2. An electric motor mount comprising a pair of spaced, parallel bars for receiving thereon and laterally slidably adjustably supporting an electric motor, said bars including channel members comprising horizontal flanges having longitudinal slots therein, and belt tighteners for the motor mounted on the flanges, said tighteners including blocks operable in the slots and engageable with the motor and having grooves therein slidably receiving the flanges and screws threadedly mounted on the flanges and operatively connected to said blocks.

3. The combination of claim 1, together with a motor belt tightener mounted on said second-named end sections and including pusher blocks slidable on the second-named end sections and engageable with the motor, and screws threadedly mounted on said second-named end sections and operatively connected to said blocks for actuating same for shifting the motor.

4. The combination of claim 3, said pusher blocks having sockets therein rotatably receiving an end portion of the screws.

References Cited in the file of this patent

UNITED STATES PATENTS

| 1,194,915 | Woolery | Aug. 15, 1916 |
| 1,974,158 | Okenfuss | Sept. 18, 1934 |
| 2,942,827 | Edson | June 28, 1960 |

FOREIGN PATENTS

| 85,354 | Norway | April 12, 1955 |